US012646372B2

(12) United States Patent
Gibson

(10) Patent No.: US 12,646,372 B2
(45) Date of Patent: Jun. 2, 2026

(54) BUTTON DESIGN, GAMING MACHINE, AND METHOD FOR GAMING MACHINES

(71) Applicant: Everi Games Inc., Austin, TX (US)

(72) Inventor: Daniel Gibson, Austin, TX (US)

(73) Assignee: Everi Games Inc., Austin, TX (US)

( * ) Notice: Subject to any disclaimer, the term of this patent is extended or adjusted under 35 U.S.C. 154(b) by 205 days.

(21) Appl. No.: 18/679,263

(22) Filed: May 30, 2024

(65) Prior Publication Data

US 2025/0371928 A1 Dec. 4, 2025

(51) Int. Cl.

| | |
|---|---|
| ***G07F 17/32*** | (2006.01) |
| ***G07F 17/34*** | (2006.01) |
| ***H01H 13/02*** | (2006.01) |
| ***H01H 13/14*** | (2006.01) |
| ***H01H 13/83*** | (2006.01) |

(52) U.S. Cl.

CPC ...... *G07F 17/3209* (2013.01); *G07F 17/3202* (2013.01); *G07F 17/3216* (2013.01); *H01H 13/023* (2013.01); *H01H 13/14* (2013.01); *H01H 13/83* (2013.01); *G07F 17/34* (2013.01); *H01H 2219/062* (2013.01); *H01H 2231/008* (2013.01)

(58) Field of Classification Search

CPC ............. G07F 17/3209; G07F 17/3216; G07F 17/3202; H01H 13/14; H01H 13/023; H01H 23/025; H01H 36/004; H01H 2219/039; H01H 2219/06; H01H 2219/062; H01H 2231/01; H01H 2231/024; H01H 2231/008

See application file for complete search history.

(56) References Cited

U.S. PATENT DOCUMENTS

| | | | | |
|---|---|---|---|---|
| 6,926,606 | B2 * | 8/2005 | Onuki | G07F 17/3202 463/31 |
| 7,892,096 | B2 * | 2/2011 | Rigsby | G07F 17/3209 463/16 |
| 9,126,113 | B2 * | 9/2015 | Johnson | G07F 17/3209 |
| 10,901,253 | B2 * | 1/2021 | Seckel | H05K 1/184 |
| 11,062,549 | B2 * | 7/2021 | Jadeja | G07F 17/3216 |
| 11,062,550 | B2 * | 7/2021 | Jadeja | G07F 17/3209 |
| 11,127,242 | B2 * | 9/2021 | Jadeja | G07F 17/3209 |
| 11,302,495 | B2 * | 4/2022 | Yoshii | H01H 13/14 |
| 11,953,714 | B2 * | 4/2024 | Ono | G02B 6/006 |
| 12,147,101 | B2 * | 11/2024 | Seckel | H01H 13/86 |
| 12,148,586 | B2 * | 11/2024 | Hill | G07F 17/3209 |

(Continued)

*Primary Examiner* — William H Mcculloch, Jr.

(74) *Attorney, Agent, or Firm* — Spencer Fane LLP; William M. Kelly

(57) ABSTRACT

A button, button deck, and method are disclosed for a gaming machine. A button deck includes multiple mechanical buttons presented along a front shelf of the gaming machine. Buttons include a push button mechanism and a transparent button cap. A one-way mirror film positioned beneath the inner surface of the transparent button cap. A light source is positioned beneath the transparent button cap. A graphical printed pattern is positioned with respect to the light source and the one-way mirror film such that when the light source is active the printed pattern is visible through the one-way mirror film, and when the light source is off the printed pattern is not visible and the transparent button cap has a mirror appearance. The light may be controlled depending on configuration data for the gaming machine, associated with an installed game.

18 Claims, 6 Drawing Sheets

(56) References Cited

U.S. PATENT DOCUMENTS

| | | | | |
|---|---|---|---|---|
| 12,400,510 | B2 * | 8/2025 | Sumi | G07F 17/3216 |
| 2003/0195035 | A1 * | 10/2003 | Onuki | G07F 17/3211 463/20 |
| 2006/0189387 | A1 * | 8/2006 | Rigsby | G07F 17/32 463/37 |
| 2008/0113707 | A1 * | 5/2008 | Nesemeier | G07F 17/3209 463/16 |
| 2010/0225499 | A1 * | 9/2010 | Peh | G06F 3/0238 340/815.69 |
| 2010/0291992 | A1 * | 11/2010 | Greenberg | G07F 17/32 463/30 |
| 2019/0066433 | A1 * | 2/2019 | Jadeja | G07F 17/3209 |
| 2019/0122486 | A1 * | 4/2019 | Onoyama | G07F 17/3213 |
| 2021/0241982 | A1 * | 8/2021 | Yoshii | H01H 13/14 |
| 2022/0223000 | A1 * | 7/2022 | Bussey | G07F 17/3211 |
| 2023/0041435 | A1 * | 2/2023 | Ono | G02B 6/006 |
| 2024/0096168 | A1 * | 3/2024 | Jadeja | G07F 17/3211 |
| 2024/0161987 | A1 * | 5/2024 | Hill | H01H 36/004 |
| 2025/0371928 | A1 * | 12/2025 | Gibson | G07F 17/3209 |

* cited by examiner

BUTTON DESIGN, GAMING MACHINE, AND METHOD FOR GAMING MACHINES

TECHNICAL FIELD OF THE INVENTION

The invention relates to gaming machine buttons and their use.

BACKGROUND OF THE INVENTION

Casino gaming machine cabinets use a variety of interfaces such as buttons, touchscreen buttons, and touchscreens. There is a large installed base of classic style gaming cabinets which employ buttons on a button deck to receive player inputs for various gaming functions. These buttons typically include a transparent button cap with a light source such as an LED underneath it, and graphics on a translucent or transparent sheet between the light source and the button to display the function of the button.

When a gaming machine is reconfigured to play a different game, a button's functionality may be altered. To make such an alteration on a classic button deck, the buttons are often reconfigured to include different graphics. When a button is no longer used, a chrome "blank" is often inserted to indicate to the player that the button has no function in the current game.

SUMMARY OF THE INVENTION

A button design, gaming machine, and method are disclosed for a gaming machine and employing a button design with the ability to replace a chrome blank button and appear as a chrome blank or a functional button with button graphics. An object of the invention is to reduce the time needed to reconfigure gaming machine button decks with chrome blank buttons. Another object is to provide reconfigurable chrome blank buttons that may be configured to be chrome blank or active merely with a software or configuration change, without the need for manually switching button hardware such as button caps to change the appearance of a button. Another object of the invention is to enable making different buttons active in different modes of a single game played on the gaming machine, and clearly communicating to a player whether a button is active or inactive.

According to a first aspect of the invention, a button includes a push button mechanism and a transparent button cap. A one-way mirror film positioned beneath the inner surface of the transparent button cap. A light source is positioned beneath the transparent button cap. A graphical printed pattern is positioned with respect to the light source and the one-way mirror film such that when the light source is active the printed pattern is visible through the one-way mirror film, and when the light source is off the printed pattern is not visible and the transparent button cap has a mirror appearance. The light may be controlled depending on configuration data for the gaming machine, associated with an installed game. The graphical printed pattern may be printed along a lower surface of the one-way mirror film, along a transparent film positioned below the one-way mirror film.

According to a second aspect of the invention, a gaming machine includes a display system, a button deck, and at least one electronic controller operatively coupled to the display system and the button deck and configured to execute instructions related to a game. The button deck includes a plurality of buttons mounted along a common mounting surface of the gaming machine. At least one of the buttons includes a push button mechanism with a transparent button cap mounted along the push button mechanism. A one-way mirror film positioned beneath the inner surface of the transparent button cap. A light source positioned beneath the transparent button cap. A graphical printed pattern positioned with respect to the light source and the one-way mirror film such that when the light source is active the printed pattern is visible through the one-way mirror film, and when the light source is inactive the printed pattern is not visible and the transparent button cap has a mirror appearance. The gaming machine includes tangible, non-transitory electronically accessible memory coupled to the at least one electronic controller and containing program code executable by the at least one electronic controller for, responsive to at least one of the buttons having a defined function in the game, turning the light source on to indicate that the at least one button is active, and responsive to the at least one button not having a defined function in the game, holding the light source inactive to allow the transparent button cap to maintain the mirror appearance.

According to another aspect of the invention, a method is provided for operating a gaming machine. The method includes, under control of at least one electronic controller of a gaming machine, responsive to the at least one button of a button deck not having a defined function in a game, holding a light source under a button cap of the at least one button inactive causing the button cap to maintain a mirror appearance with a one-way mirror film between the light source and the button cap. Responsive to at least one button of the button deck having a defined function in the game, the method includes sending a signal to the button deck turning the light source on to indicate that the at least one button is active. Indicating that button is active may include shining light from the light source through a printed pattern positioned between the light source and a one-way mirror surface of the one-way mirror film.

These and other advantages and features of the invention will be apparent from the following description of illustrative embodiments, considered along with the accompanying drawings.

BRIEF DESCRIPTION OF THE DRAWINGS

FIG. 2 shows a logical and hardware block diagram of the gaming machine of

FIG. 1.

DESCRIPTION OF ILLUSTRATIVE EMBODIMENTS

Figure 1:
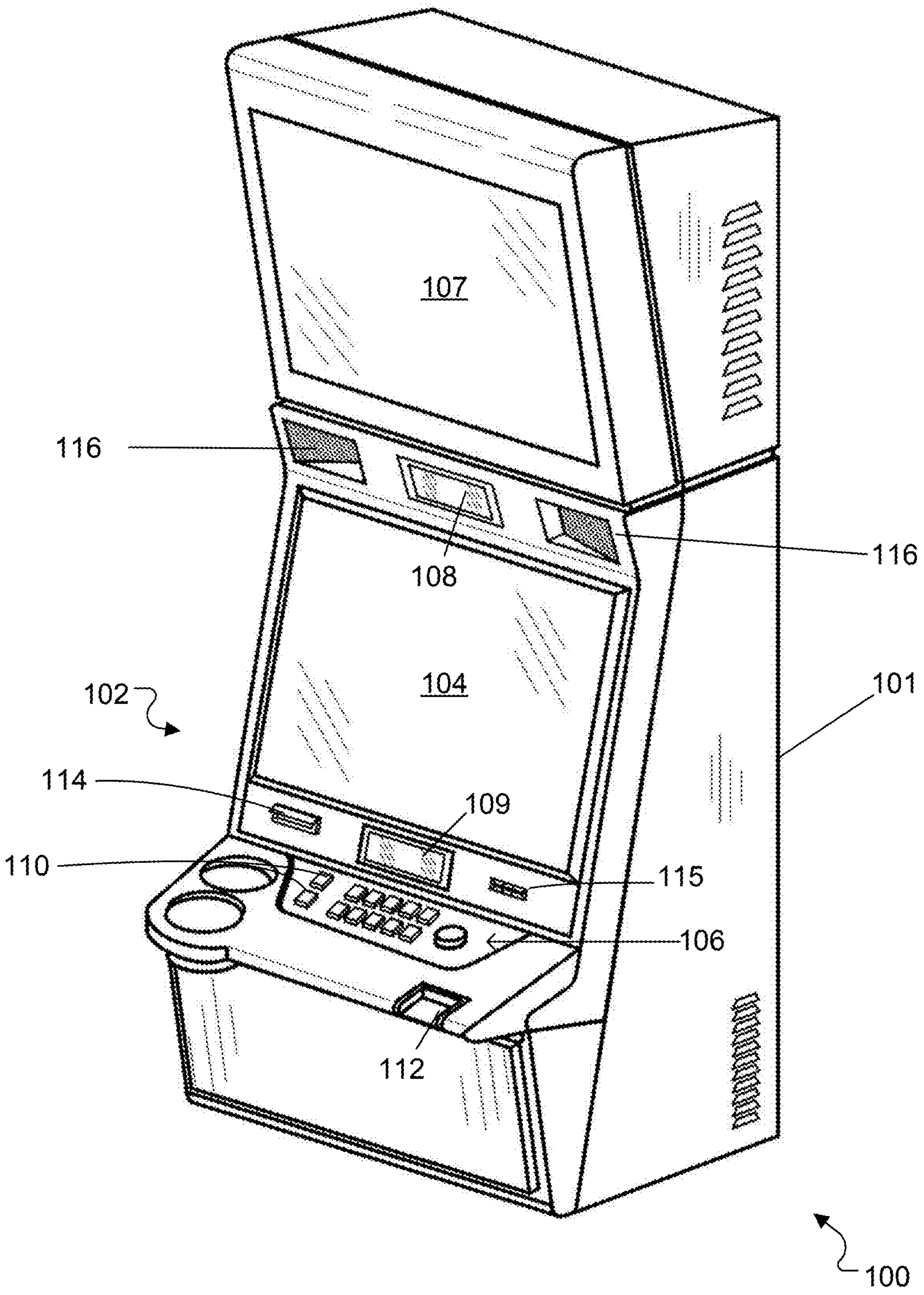
FIG. 1 shows a gaming machine including a button deck with mechanical buttons according to some embodiments of the present invention.
Figure 2:
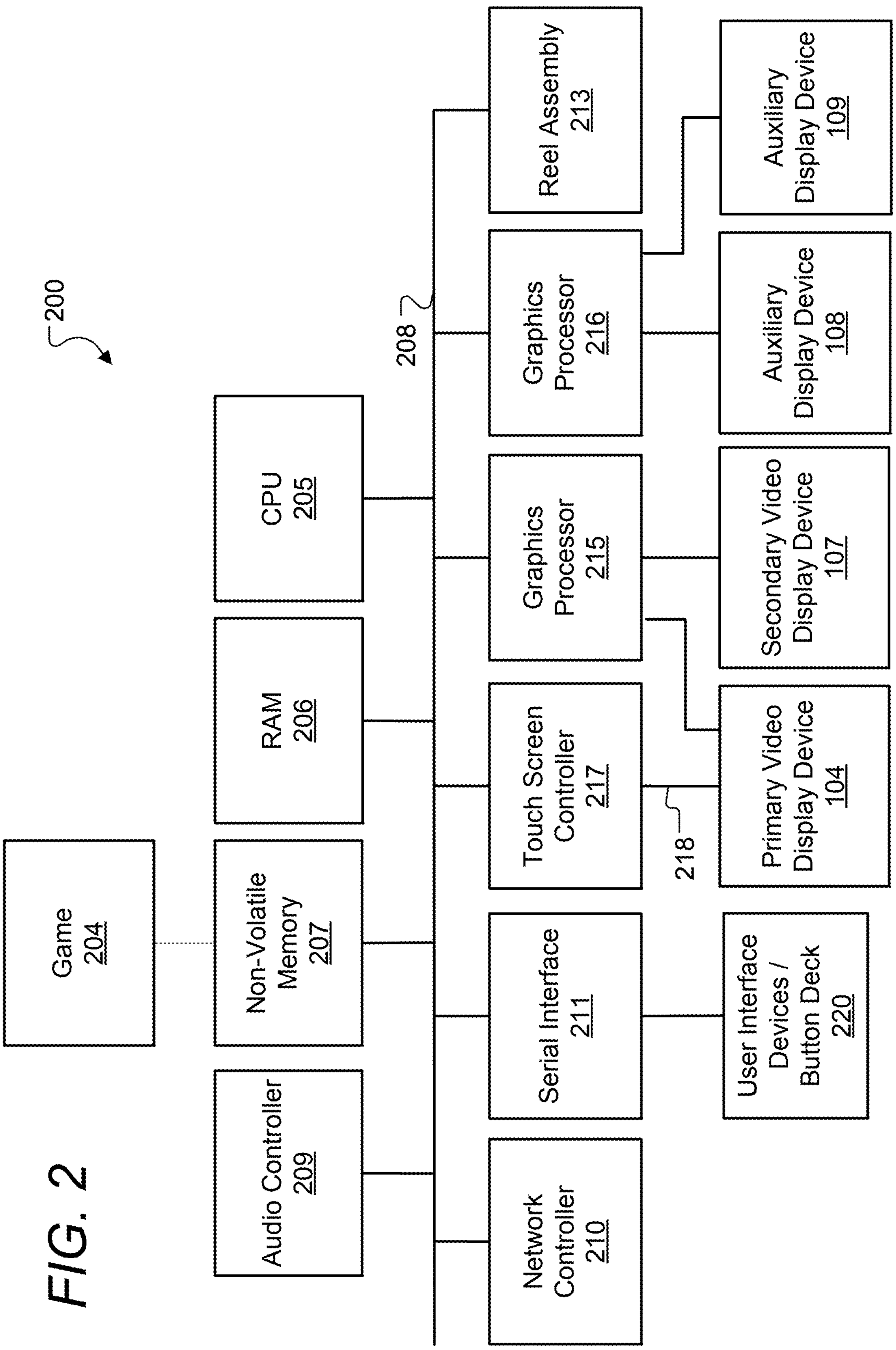

FIG. 1 shows a gaming machine 100 including a button deck with mechanical buttons according to some embodiments of the present invention. The block diagram of FIG. 2 shows further details of gaming machine 100 along with certain variations which may be included in the gaming machine. Referring to FIG. 1, gaming machine 100 includes a cabinet 101 having a front side generally shown at reference numeral 102. A primary video display device 104 is mounted in a central portion of the front side 102, with a button panel 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future. One or more of these video display devices, and especially primary video display device 104, may be used to display game symbols which show the results for a given play of the game implemented through gaming machine 100. Such results may be shown by the manner in which game symbols are aligned along various paylines defined through a symbol location matrix presented by the display device 104. As will be described further below in connection with FIG. 2 and elsewhere, it is also possible for gaming machines within the scope of the present invention to include mechanical elements such as mechanical reels. One or more of the video display devices may also be used to show results in the form of a hand of playing cards, a dice roll, a horse race, or in any other fashion in which a result may be displayed. Generally, the display device or display devices of the gaming machine, whether video display devices, mechanical devices, or combinations of the two, which are used to display games according to embodiments of the invention, may be described in this disclosure and the accompanying claims as a display system.

The gaming machine 100 illustrated for purposes of example in FIG. 1 also includes a number of mechanical control buttons 110 mounted on button panel 106. These control buttons 110 may allow a player to select a bet level, select paylines, select a type of game or game feature, and make a play input to start a play in a game. The player interface devices which receive player inputs to initiate the play of a game through the gaming machine, such as controls to select a wager amount for a given play and controls to enter a play input to actually start a given play in the wagering game, may be referred to generally as a player input system.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Numerous other types of player interface devices may be included in gaming machines that may be used to implement embodiments of the present invention.

A gaming machine which may be used to implement embodiments of the present invention may also include a sound system to provide an audio output to enhance the user's playing experience. For example, illustrated gaming machine 100 includes speakers 116 which may be driven by a suitable audio amplifier (not shown) to provide a desired audio output at the gaming machine.

FIG. 2 shows a logical and hardware block diagram 200 of gaming machine 100 which includes a central processing unit (CPU) 205 along with random access memory (RAM) 206 and nonvolatile memory or storage device 207. All of these devices are connected on a system bus 208 with an audio controller device 209, a network controller 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of the respective display device, in this case primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with gaming machine electronics. These elements may be mounted on a chassis and held in a housing which itself may be mounted in cabinet 101 shown in FIG. 1. Alternatively, the various electronic components may be mounted on one or more circuit boards housed within cabinet 101 without a separate enclosure. It will be appreciated that some of the devices shown in FIG. 2 as being connected directly on system bus 208 may in fact communicate with the other system components through a suitable expansion bus. Audio controller 209, for example, may be connected to the system via a PCI or PCIe bus. System bus 208 is shown in FIG. 2 merely to indicate that the various components are connected in some fashion for communication with CPU 205 and is not intended to limit the invention to any particular bus architecture. Numerous other variations in the gaming machine internal structure and system may be used without departing from the principles of the present invention. For example, a gaming machine in some embodiments of the present invention may rely on one or more data processors which are located remotely from the gaming machine itself. Embodiments of the present invention may include no processor such as CPU 205 or graphics processors such as 215 and 216 at the gaming machine, and may instead rely on one or more remote processors. Thus unless specifically stated otherwise, the designation "gaming machine" is used in this disclosure and the accompanying claims to designate a system of devices which operate together to provide the indicated functions. A "gaming machine" may include a gaming machine such as gaming machine 100 shown in FIGS. 1 and 2, which is itself a system of various components, and may also include one or more components remote from a gaming machine cabinet (that is, cabinet 101 in FIG.

1). Thus the designation "gaming machine" encompasses both a stand-alone gaming machine and a gaming machine (that is, the part housed in a cabinet such as cabinet 101 in FIG. 1) along with one or more remote components for providing various functions (such as generating outcomes for plays in a game, and driving display devices mounted in a gaming machine cabinet).

In the illustrated gaming machine 100, CPU 205 executes software, that is, program code, which ultimately controls the entire gaming machine including the receipt of player inputs and the presentation of the graphics or information displayed according to the invention through the display devices 104, 107, 108, and 109 associated with the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for game software such as program code 204 prior to loading into random access memory 206 for execution, or for programs not in use or for other data generated or used in the course of gaming machine operation. Network controller 210 provides an interface to other components of a gaming system in which gaming machine 100 may be included.

The example gaming machine 100 which may be used to implement some embodiments of the present invention is shown in FIG. 2 as including user interface devices positioned on or near button deck 220 (part of a player input system) connected to serial interface 211. These user interface devices may include various player input devices such as mechanical buttons shown on button panel 106 in FIG. 1, and/or levers, and other devices. It will be appreciated that the interface between CPU 205 and other player input devices such as player card readers, voucher readers or printers, and other devices may be in the form of serial communications. Thus serial interface 211 may be used for those additional devices as well, or the gaming machine may include one or more additional serial interface controllers.

Reel Assembly 213 is shown in the diagram of FIG. 2 to illustrate that a gaming machine which may be used for various embodiments of the invention may include mechanical reels. For example, a set of mechanical reels may replace the primary display device 104, or at least part of that display device. Alternatively, mechanical reels may be included in the gaming machine behind a light-transmissive video display panel. In either case, the mechanical reels represent a display device for displaying various game symbols in the course of a game play.

Figure 3:
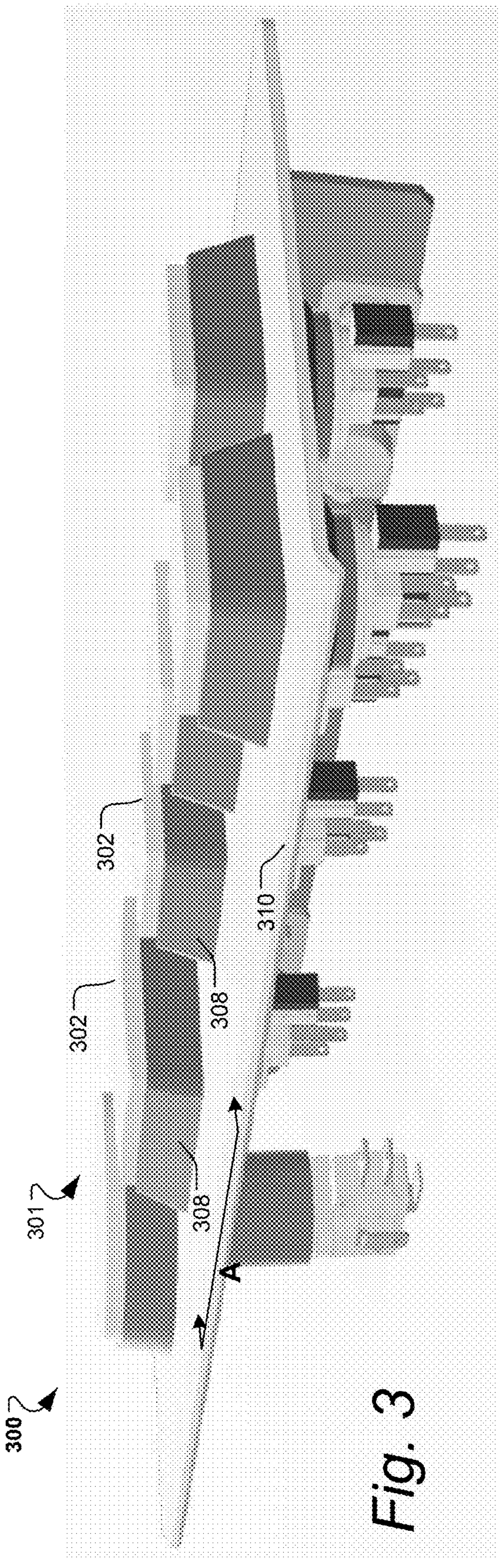
FIG. 3 shows a perspective view of a button deck assembly according to some embodiments of the invention.

FIG. 3 shows a perspective view of a button deck assembly 300 according to some embodiments. Button deck assembly 300 is suitable for use in the gaming machine 100 of FIG. 1, or other gaming machines which employ multiple mechanical buttons and have need of a button reconfiguration apparatus and procedure as described herein. Button deck assembly 300 generally includes a number of buttons 301 mounted thereto and each including a button cap 302 and a body 308, along with various mechanical and electrical features enabling the button operation. Each of buttons 301 includes various electrical terminals 316 presented along the lower side of button deck assembly 300 for making electrical connection to the serial interface of the host gaming machine with appropriate wiring and connectors (not shown).

Figure 4:
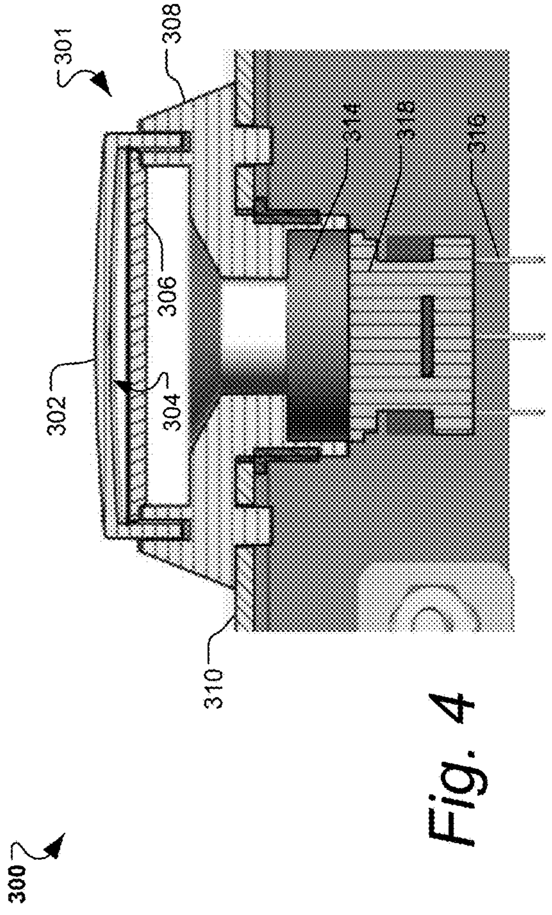
FIG. 4 shows a cutaway end perspective view of button deck assembly taken along the line "A" of FIG. 3.

FIG. 4 shows a cutaway side view of button deck assembly 300 taken along the line "A" of FIG. 3. The depicted cutaway section of button 301 shows the push button mechanism and structure mounted through button deck 310 and including a transparent button cap 302, a one-way mirror film 304 applied along the inner surface of transparent button cap 302, a body 308, a diffuser 306, a light source 314, and a push button mechanism including electrical terminals 316, and a switch mechanism 318.

Button cap 302 is transparent, preferably formed of transparent plastic or other suitable material, and has an outer contact surface and an inner surface. Button cap 302 is mounted atop the push button mechanism and moves downward when pressed to activate the push button mechanism. Any suitable spring or deformable button mechanism may be used to translate pressure on the button to an electrical contact at switch mechanism 318.

One-way mirror film 304 is preferably applied to the lower surface of button cap 302 with the mirror side facing up, to create a mirror appearance when light source 314 is not active, but allows light from light source 314 to pass through when light source 314 is active. A graphical printed pattern is printed on lower surface of one-way mirror film 304 such that when light source 314 is active the printed pattern is visible through one-way mirror film 304, and when light source 314 is off, the printed pattern is not visible and transparent button cap 302 has a mirror appearance.

While, in this embodiment, the printed pattern is on the lower depicted surface of one-way mirror film 304, in other embodiments it may be in another position, such as applied as a separate transparent film beneath one-way mirror film 304, or atop diffuser 306, or in any suitable position between light source 314 and one-way mirror film 304. The printed pattern and one-way mirror film 304 may both be positioned atop diffuser 306.

In this embodiment, diffuser 306 is a translucent light diffusing layer constructed of a suitable material such as translucent plastic. In other embodiments, if a suitably diffuse light source is employed, no diffuser may be present.

Light source 314 in this embodiment is an LED light source, and may include single or multiple LEDs. Other suitable light sources may also be used. A color controllable light source may also be used. Generally, light source 314 is controlled by a signal by a button deck controller, which includes separate drivers for each light source in button deck 310.

Figure 5:
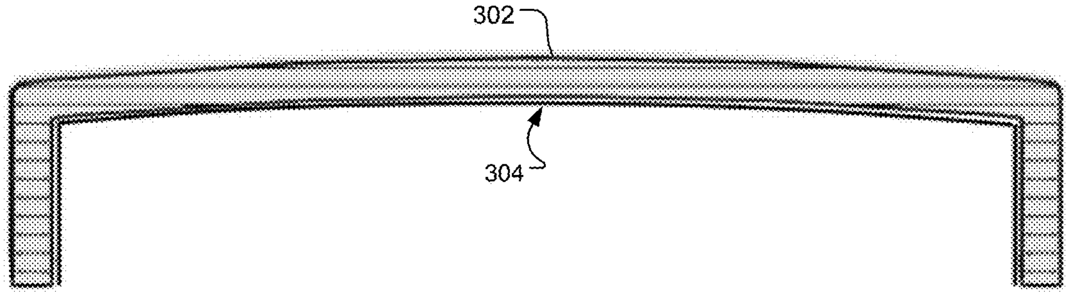
FIG. 5 shows a cross section view of a button cap according to one example embodiment.

FIG. 5 shows a cross section view of a button cap 302 according to one example embodiment. In this embodiment, one-way mirror film 304 is preferably applied to the lower surface of button cap 302 with the mirror side facing up. Preferably, one-way mirror film 304 is a mylar film or other suitable plastic film layer, with an adhesive layer for application to button cap 302. A graphical printed pattern is printed on lower surface of one-way mirror film 304 such that when light source 314 is active the printed pattern is visible through one-way mirror film 304, and when light source 314 is off, the printed pattern is not visible and transparent button cap 302 has a mirror appearance.

Figure 6:
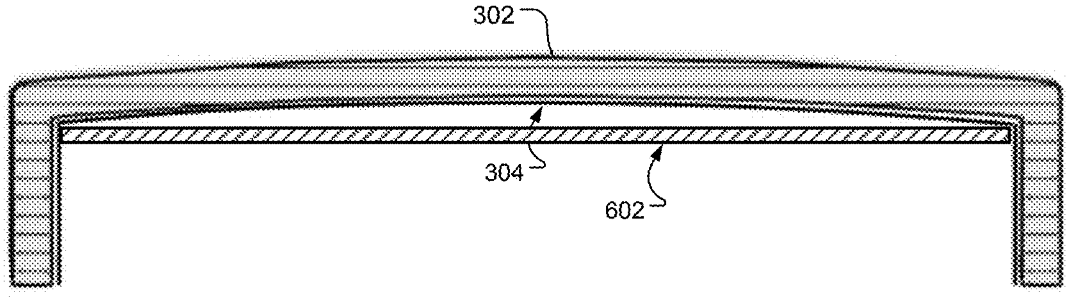
FIG. 6 shows a cross section view of a button cap according to another example embodiment.

FIG. 6 shows a cross section view of a button cap 302 according to another example embodiment. A transparent plastic layer 602 is positioned below the lower surface of one-way mirror film 304. Plastic layer 602 may be formed in a cap shape to fit inside button cap 302, or another suitable shape to be secured inside the button assembly. Plastic layer 602 may be placed above or atop diffuser 306. The printed pattern indicating the button functionality may be printed along a top surface of plastic layer 602, or may be applied as a film. In some embodiments, a film is applied directly to diffuser 306.

Figure 7:
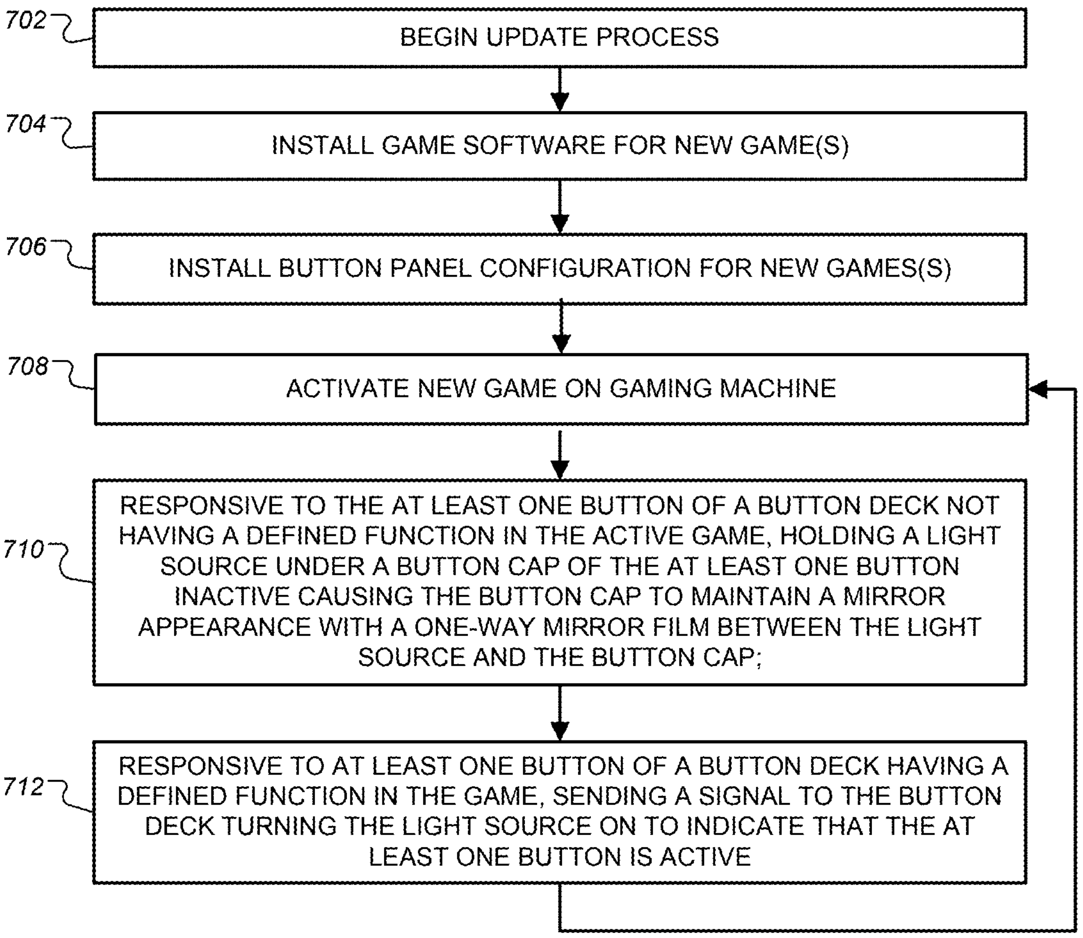
FIG. 7 shows a flowchart of a process for updating and operating a gaming machine according to some embodiments.

FIG. 7 shows a flowchart of a process for updating and operating a gaming machine according to some embodiments. The depicted process allows a gaming machine button deck to be updated to display "chrome front" style inactive buttons for any particular game, but to activate them when any particular button has a defined function the game.

At block 702, the process of updating a gaming machine to play a different game with a possibly different button configuration begins. The new game may include more or fewer functional buttons. At block 704, software for the one or more new games is installed on the machine using any suitable software update procedure. Along with each game, a button panel configuration is installed on the gaming machine at block 706. This configuration indicates whether each button on the button deck has a defined function in the game, and is used to control the light source of the button. The configuration may be a file or a group of settings for serial interface driver for the button deck, such as serial interface 211 and button deck 220 of FIG. 2. If functionality for particular buttons is changed for a game, the process also includes installing new graphical printed pattern under the button cap. This may include replacing the one-way mirror film or another transparent film under the one-way mirror film.

At block 708, the new game is activated for play on the machine, which may be accomplished in any suitable manner such as through a casino management system or by a technician accessing the gaming machine.

During game operation at blocks 710 and 712, each button functions to display either a mirror surface or a graphical indicator of the button function depending on whether the button has a defined function in the game. At block 710, under control of at least one electronic controller of the gaming machine, responsive to the at least one button of a button deck not having a defined function in a game, the process holding a light source under a button cap of the at least one button inactive causing the button cap to maintain a mirror appearance with a one-way mirror film between the light source and the button cap. u At block 712, responsive to at least one button of a button deck having a defined function in the game, sending a signal to the button deck turning the light source on to indicate that the at least one button is active. Indicating that button is active includes shining light from the light source through a printed pattern positioned between the light source and a one-way mirror surface of the one-way mirror film.

While in the depicted method, light source is changed responsive to game configuration changes when game software is changed, the techniques herein may also be employed to change the appearance of a button to a chrome (inactive) appearance when a game changes mode, without any changes to the game installed. This allows a gaming machine to enable making different buttons active in different modes of a single game played on the gaming machine, and clearly communicating to a player whether a button is active or inactive.

Figure 8:
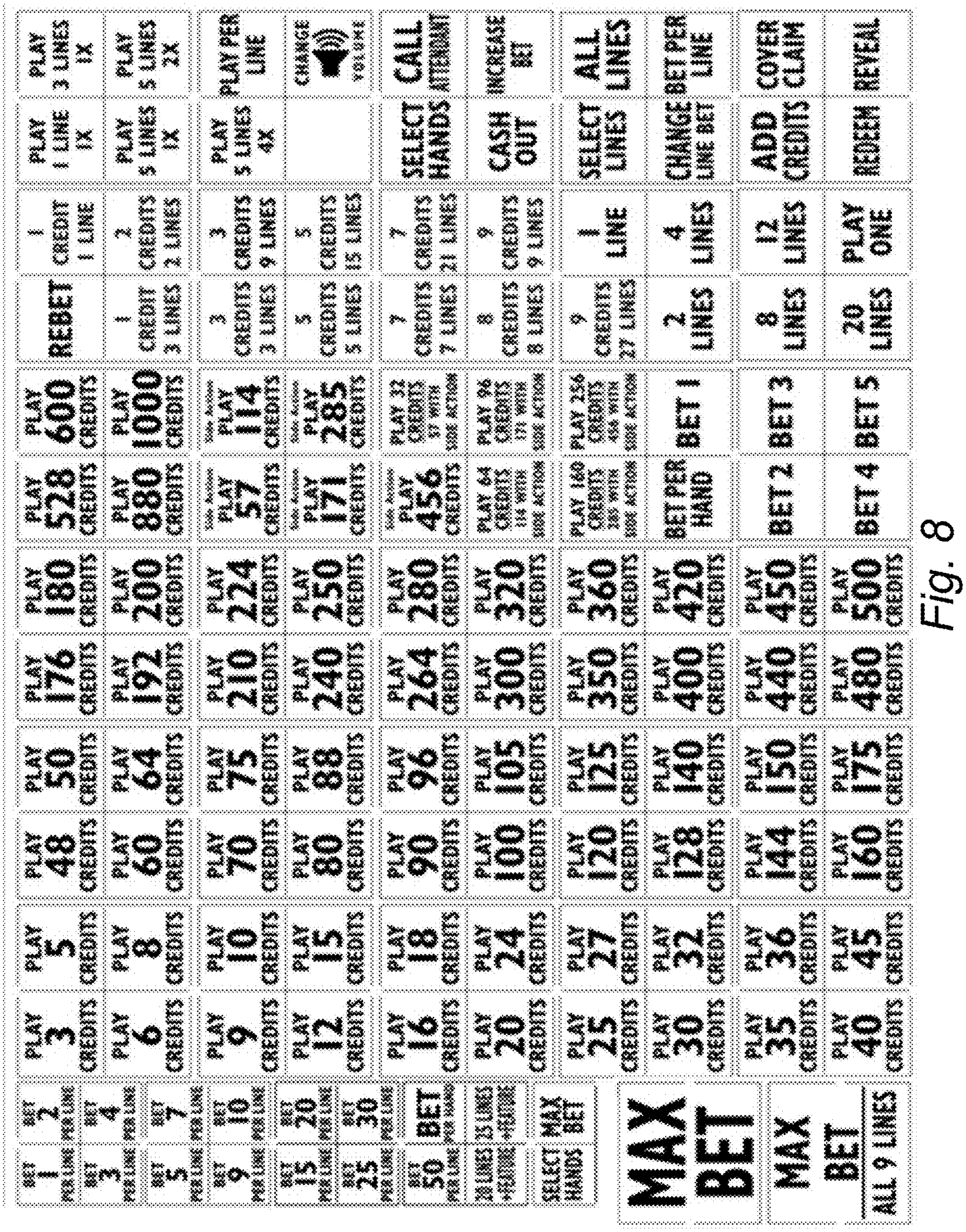
FIG. 8 shows a number of examples for graphical printed patterns which may be used to indicate functionality of buttons according to some embodiments.

FIG. 8 shows a number of examples for graphical printed patterns which may be used to indicate functionality of buttons according to various embodiments. As can be seen, various game functions including bet levels, payline selection, play activation, and other game functions. Any suitable game functions may be used and illustrated with a graphical pattern positioned as described above.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A button for a button deck of a gaming machine comprising:
- a push button mechanism;
- a transparent button cap mounted along the push button mechanism and including an outer contact surface and an inner surface;
- a one-way mirror film positioned beneath the inner surface of the transparent button cap;
- a light source positioned beneath the transparent button cap; and
- a graphical printed pattern positioned with respect to the light source and the one-way mirror film such that when the light source is active the printed pattern is visible through the one-way mirror film, and when the light source is off the printed pattern is not visible and the transparent button cap has a mirror appearance.

2. The button of claim 1 further comprising a light diffuser positioned between the light source and the one-way mirror film.

3. The button of claim 2 wherein the one-way mirror film is applied along an upper surface of the light diffuser.

4. The button of claim 3 wherein the graphical printed pattern is printed along a lower surface of the one-way mirror film.

5. The button of claim 3 wherein the graphical printed pattern is printed along a transparent film positioned below the one-way mirror film.

6. The button of claim 2 wherein the one-way mirror film is applied along the inner surface of the transparent button cap.

7. The button of claim 6 wherein the graphical printed pattern is printed along a lower surface of the one-way mirror film.

8. The button of claim 6 wherein the graphical printed pattern is printed along a transparent film positioned below the one-way mirror film.

9. A gaming machine comprising:
- a display system, a button deck, and at least one electronic controller operatively coupled to the display system and the button deck and configured to execute instructions related to a game, the button deck comprising a plurality of buttons mounted along a common mounting surface of the gaming machine, at least one of the buttons comprising:
  - a push button mechanism;

a transparent button cap mounted along the push button mechanism and including an outer contact surface and an inner surface;

a one-way mirror film positioned beneath the inner surface of the transparent button cap;

a light source positioned beneath the transparent button cap; and a graphical printed pattern positioned with respect to the light source and the one-way mirror film such that when the light source is active the printed pattern is visible through the one-way mirror film, and when the light source is inactive the printed pattern is not visible and the transparent button cap has a mirror appearance; and tangible, non-transitory electronically accessible memory coupled to the at least one electronic controller and containing program code executable by the at least one electronic controller for, responsive to at least one of the buttons having a defined function in the game, turning the light source on to indicate that the at least one button is active, and responsive to the at least one button not having a defined function in the game, holding the light source inactive to allow the transparent button cap to maintain the mirror appearance.

10. The gaming machine of claim 9 further comprising a light diffuser positioned between the light source and the one-way mirror film.

11. The gaming machine of claim 10 wherein the one-way mirror film is applied along an upper surface of the light diffuser.

12. The gaming machine of claim 11 wherein the graphical printed pattern is printed along a lower surface of the one-way mirror film.

13. The gaming machine of claim 11 wherein the graphical printed pattern is printed along a transparent film positioned below the one-way mirror film.

14. The gaming machine of claim 9 wherein the one-way mirror film is applied along the inner surface of the transparent button cap.

15. The gaming machine of claim 14 wherein the graphical printed pattern is printed along a lower surface of the one-way mirror film.

16. The gaming machine of claim 14 wherein the graphical printed pattern is printed along a transparent film positioned below the one-way mirror film.

17. A method of operating a gaming machine comprising:

under control of at least one electronic controller of a gaming machine, responsive to at least one button of a button deck not having a defined function in a game, holding a light source under a button cap of the at least one button inactive, causing the button cap to maintain a mirror appearance with a one-way mirror film between the light source and the button cap; and responsive to at least one button of the button deck having a defined function in the game, sending a signal to the button deck turning the light source on to indicate that the at least one button is active.

18. The method of claim 17 wherein indicating that button is active comprises shining light from the light source through a printed pattern positioned between the light source and a one-way mirror surface of the one-way mirror film.

* * * * *